United States Patent [19]

Schmidt

[11] Patent Number: 4,922,466

[45] Date of Patent: May 1, 1990

[54] METHOD AND APPARATUS FOR PRESENTING SEISMIC TRACES

[75] Inventor: Burkhard Schmidt, Hanover, Fed. Rep. of Germany

[73] Assignee: Prakla-Seismos AG, Hanover, Fed. Rep. of Germany

[21] Appl. No.: 250,736

[22] Filed: Sep. 29, 1988

[30] Foreign Application Priority Data

Sep. 30, 1987 [DE] Fed. Rep. of Germany ....... 3733470

[51] Int. Cl.$^5$ .............................................. G01V 1/34
[52] U.S. Cl. ....................................... 367/68; 367/71; 367/74
[58] Field of Search .................. 367/63, 64, 68, 70, 367/71, 74, 13

[56] References Cited

U.S. PATENT DOCUMENTS

| | | | |
|---|---|---|---|
| 3,458,859 | 7/1969 | Godfrey et al. | 340/15.5 |
| 3,895,342 | 7/1975 | Mallett et al. | 367/63 |
| 3,961,306 | 6/1976 | Austey | 367/70 |
| 4,279,026 | 7/1981 | Lambright et al. | 367/70 |
| 4,323,990 | 4/1982 | Goode et al. | 367/74 |
| 4,397,007 | 8/1983 | Goode et al. | 367/68 |
| 4,574,358 | 3/1986 | Peterson et al. | 364/550 |

FOREIGN PATENT DOCUMENTS

2040296 of 0000 Fed. Rep. of Germany .
2644886C2 of 0000 Fed. Rep. of Germany .

OTHER PUBLICATIONS

Prakla-Seismos Information No. 10; Real Amplitude Processing; pp. 1-6; 1978.

*Primary Examiner*—Thomas H. Tarcza
*Assistant Examiner*—Ian J. Lobo
*Attorney, Agent, or Firm*—Walter C. Farley

[57] ABSTRACT

A method and apparatus for immediate, substantially real-time representation of the traces of seismic measurements in which the exponents and sign of the signal sample from the stream of data transmitted to a data recording unit (2) are uncoupled and are displayed as gradations of color on a monitor (6) of a personal computer. in this manner a quick overview of the measurement can be obtained, and the correctness of the installation and the operability of the receivers can be determined.

8 Claims, No Drawings

METHOD AND APPARATUS FOR PRESENTING SEISMIC TRACES

This invention involves a method for direct display of seismic traces on a data output device, especially a cathode ray tube, in which the time-dependent signals that are received substantially simultaneously from a large number of seismic detectors are converted into a standardized digital data transmission format and sent to a recording unit, the data transmission format having first signal portions that correspond to the exponents of the signal and second signal portions that correspond to the mantissas of the signal.

A process of the kind to which the invention relates makes use of a known magnetic tape recording process in seismology. The SEG-D format that is used in this regard is a digital recording format in which the mantissas and the signs of a sample that has been received are transmitted separately from the exponents. The exponent corresponds in this respect to the preset amplification factor of the preamplifier that is switched on in which the analog-to-digital converter operates in its optimal working range, regardless of the actual amplitude of the recording signal.

The invention further concerns a device for representing seismic traces on a data output device, in particular for carrying out a display process in which the signals received simultaneously by a large number of seismic detectors are converted by a first coder into a standardized digital data transmission format and are sent to a recording unit, the data transmission format containing first signal portions that correspond to the exponents of the signal and second signal portions that correspond to the mantissas of the signal.

BACKGROUND OF THE INVENTION

Seismic exploration methods that are used today require the recording and evaluation of a large amount of field data, which as a rule are received by geophones or hydrophones. A typical recording system uses 256 traces which are allocated to individual geophones, hydrophones or groups of receivers.

As a rule the signals that are received are recorded in a time division multiplex process on a storage medium, the recording on the magnetic tape itself taking place in the form of nine parallel tracks.

A body of data recorded in accordance with the process cited is, as a rule, subjected to various corrective measures, such as dynamic and static corrections, stacking or something similar, before its final presentation. This does not take place in the field but only in the computer center.

For evaluation and analysis of the seismic traces, the traces allocated to individual receivers or receiver groups (e.g. 256) are recorded side by side, commonly on a paper carrier, the amplitude of a trace being represented perpendicular to the time axis. For better legibility the areas under the positive half-waves of the trace are often blackened, i.e. a so-called thickened notation is formed. Representations of the seismogram on screens are also possible.

Thickened notation representations of this kind can be found in the company publication of applicant's assignee, Prakla-Seismos AG, Information No. 10, dated 1978. Along with a blackening of half-waves a colored accentuation, also in thickened notation, is also provided for identifying distinguishing special amplitude values. This representation was chosen in order to improve the amplitude resolution in such seismograms, which are inherently inadequate for certain actual amplitudes.

This publication deals exclusively with possibilities of being able to undertake the most varied evaluations of the data that have been recorded in a computer center. In this process, however, neither an immediate qualitative nor a quantitative rough estimate of a measured pattern is possible during the field operations. If it should turn out during subsequent evaluation in the computer center that certain receivers or groups of receivers malfunctioned during the recording, repetition of the recording is only possible with substantial effort and cost.

Although the process described makes possible precise and effective evaluation of seismic signals, the fact that the evaluation is only undertaken after the fact is rather an obstacle for field operations, in particular with regard to monitoring the reliability of the individual measurements. If one wishes to determine during a seismic measurement or immediately afterward whether the measurements being undertaken are within a prescribed tolerance range, whether the signals of individual receivers or groups of receivers are outside the expected signal ranges or whether there are defective receivers or receiver installations, this process cannot be used.

Although a device for testing outlying geophones that are attached to a seismic receiving device is known from German Patent No. 26 44 886, the detection of errors that have occurred does not take place directly on the basis of field signals that are received but through the aid of artificial signals. Hence, substantial additional expenditure is required for this kind of testing of the operability of geophones.

U.S. Pat. No. 3,458,859 cites a process for comparing the traces of seismograms that were obtained from a digital data transmission format with amplification control. In the process the original amplification factor, which was in steps, is replaced by an interpolation function for output. This device has nothing in common with the invention.

German prosecuted patent application No. 20 40 296 shows a process for representing geophysical values on a two-dimensional surface, the recording being in the form of a color representation. In that process there is no usable representation on a cathode ray tube, but the latter serves only as a transmission means in which the information portrayed on the screen of a cathode ray tube is transmitted via a cylinder lens to a drum recording device.

SUMMARY OF THE INVENTION

It is therefore an object of the present invention to provide a method and an apparatus for direct representation of seismic traces on a data output device through which direct detection of defective seismic receiving devices and/or installations and also a rough qualitative assessment of a pattern that has been measured is possible.

This object is attained through the invention listed in claims 1 and 5. Advantageous embodiments of the invention are given in the subordinate claims.

The special advantage of the invention lies in the immediacy of the assessment following a seismic measurement. Not only can defective receivers be detected but also a rough estimate of the pattern that has been determined for a measurement can be undertaken. If, on the basis of information from the representation in accordance with the invention, an evaluation of the recording that has been made does not appear possible, a new measurement can be made right away, if desired, without having to wait for the result of an evaluation at the computer center. Defective receivers can be replaced right away, and it is immediately evident whether the receivers have been installed correctly.

A device in accordance with the invention is simple to construct and requires no significant modifications in existing recording devices. The usual recording is not hampered by the method and apparatus of the invention.

The process in accordance with the invention provides for the signal portions corresponding to the exponent of a signal to be uncoupled from the standardized data transmission format sent to the recording unit, the uncoupled signal to be stored temporarily and the uncoupled signal of the various received signals to be converted through a code transformation into representational elements that can be read from a data output device. The representational elements of the received signals are portrayed on the data output device as straight lines along a time axis, the representational elements of the various receivers or groups of receivers being arranged side by side perpendicular to the time axis.

In this process the signal traces are not portrayed in thickened notation, as in a usual seismogram, but rather as straight lines. This makes possible a very high trace density which can be up to sixteen times as high as in a usual thickened notation. Hence, it is possible to show up to 256 traces simultaneously on the screen of a cathode ray tube as a matter of course. A signal trace portrayed over the time axis therefore does not have any deviation oriented crosswise of the time axis.

The representation of the amplitude occurs in the method of the invention through a variable color representation of the trace along the time axis. Since, in the standardized recording format, the amplitude information is given by a 3-bit representation plus sign, it is possible when using this process to represent up to 16 different amplitude levels within one trace. This is sufficient for detecting defective installations or defective receiving devices. Since the formation of an image portrayed according to this method can take place within 5 to 10 seconds after a recording, it is possible to monitor each shot of a seismic recording series immediately after the recording.

BRIEF DESCRIPTION OF THE DRAWINGS

The invention is explained below in greater detail using one embodiment as an example with reference to the accompanying drawings wherein:

FIGS. 1a–1c are a representation of the recording format that is used;

FIG. 2 is a schematic view of an arrangement of apparatus in accordance with the invention; and FIGS. 3a and 3b show examples, respectively, of a usual seismogram and a representation produced by the process in accordance with the invention, for comparison.

DESCRIPTION OF THE PREFERRED EMBODIMENT

Position relationship, interference and useful signal amplitudes are important for the technical evaluation of the traces of a seismic recording. In order to portray these various parameters, the prior art requires the evaluation of the recordings in a different direction. If it turns out that one or more receivers or groups of receivers have provided defective signals, a new measurement with substantial expenditures may be necessary or else only limited information can be obtained concerning a seismic profile.

According to the invention the evaluation of a seismic recording can be carried out immediately following the measurement. In accordance with the invention the exponent values of the amplitude signal from the data signal that is sent to the recording device from each sample of the individual measurements are branched off as display signals and sent to a data output device. The exponent of each signal value is used here to represent the amplitude value of the signal in discrete levels. The exponents of the amplitude values are read into a semiconductor intermediate storage unit over the whole duration of a recording and can then be portrayed in a fashion similar to usual seismic traces on a screen.

On the screen each trace of a receiver or group of receivers is portrayed as a single line. All 256 traces for a recording can thus be portrayed one under the other in a vertical direction on the screen. The time axis runs in the horizontal direction here. The different amplitude values of the recording that are represented by the uncoupled exponents are shown by different kinds of representations of the individual points on the screen. Preferably a color screen is used, and eight colors, for example, are selected for different amplitude ranges. If each color value is associated with an amplitude range of 12 dB, for example, a dynamic range of 96 dB can be portrayed by eight different colors. In practice this satisfies the requirements for determining the state of the receiving devices that are used.

The representation on the screen makes various assessments possible. In the area of the traces before the first employment of seismic impulses a hydrophone or geophone suffering from interference can be detected quite easily through comparing the color portrayal of adjacent traces. The amplitude values of the seismic signals can be compared further through comparing adjacent traces during the whole period of time covered. To the extent that the signals from one trace distinctly stand out from those of neighboring traces, it can be assumed that the measurement setup in this regard is either defective or incorrectly installed. Further, a signal in the wrong phase relationship can be detected without further ado if the sign of a signal is uncoupled along with the amplitude values. From this, inferences can be made about a reversal of the polarity of a hydrophone or geophone, for example. In addition the screen representation permits a rough idea of the pattern to be covered. This makes possible an immediate change and adaptation of a receiver setting to the pattern structure that has been detected.

FIG. 1a shows the representation of the recording format according to the SEG-D standard. In the horizontal direction in each case a byte is portrayed together with a parity bit. The byte is recorded on 8+1 parallel traces of a magnetic tape. The vertical axis corresponds to the time axis. In each case four samples (measurement values) are combined into a group, the first byte of this group being the exponents of samples 1 and 2 and the second byte of this group containing the exponents of samples 3 and 4. In the following 8 bytes the mantissa value Q together with the sign S are indicated in 16-bit format.

For the purposes of the invention only the exponent values and sign of the individual samples are used. Through an interface (FIG. 2) the exponent values $C_1$, $C_2$ and $C_3$ as well as the sign S are uncoupled from the data format. The result is an output format which is portrayed in FIG. 1c. The exponent bit $C_0$ is not used.

The exponents that were branched out of the data transmitted in SEG-D format in time division multiplex are then transmitted to an intermediate storage unit (FIG. 2).

The interface for branching off the exponents and the sign consists in accordance with FIG. 1b of various memory components, latches and a control logic, which are interconnected in a suitable manner for branching off the data in accordance with the invention. For impeccable determination of the correct byte for branching off the exponents, supplemental control signals are brought in, which are transmitted together with the data transmitted in SEG-D format and promote synchronization. Out of this a synchronization signal is branched off that serves to control the intermediate memory storage unit 5, the coder 4 and the screen 6.

The data format that is used permits reading the exponents relatively easily from the recorded data stream. The readout takes place in accordance with FIG. 2 in an interface circuit 1 that is appropriate for this and is located between the first coder and the recording unit 2. The first coder 3 serves to convert the data received into the SEG-D format. The data are transmitted to the magnetic recording device 2 without being affected otherwise. The sign and exponent bits of the sample that are read out by the interface 1 are preferably sent to an intermediate storage unit 5 (dual ported RAM) in which the data from a recording then are either portrayed as a whole or partially for better clarity on the screen 6 of an attached personal computer, being converted in the process into different representational elements (e.g. colors) by a second coder 4. The data are then directly transmitted to the video buffer of the monitor. The coder 4 preferably converts the data into the standard EGA format.

For better clarity, enlargements of sectors or other representations of details can take place. In place of a color representation various half-tones can also be portrayed. Further it is possible to print the representation on a dot matrix printer or plotter instead of on a monitor.

For comparison, FIG. 3a shows the representation of a usual seismogram and FIG. 3b shows a representation produced in accordance with the invention.

In each recording one trace is distorted, e.g. as a result of a defective geophone. In the lower representation this defective trace can be recognized clearly as a straight solid line, while in the usual seismogram representation above it can only be recognized by careful examination. In this regard it should be emphasized that the upper representation could only be produced at the end of the data processing in the computer center, and hence there was no possibility to undertake corrective measures right away in the field operations. It should also be emphasized that the upper representation shows only 96 traces, while the lower one shows 190 traces.

Although the trace density is substantially higher, the recognizability of defective traces is considerably increased.

While one advantageous embodiment has been chosen to illustrate the invention, it will be understood by those skilled in the art that various changes and modifications can be made therein without departing from the scope of the invention as defined in the appended claims.

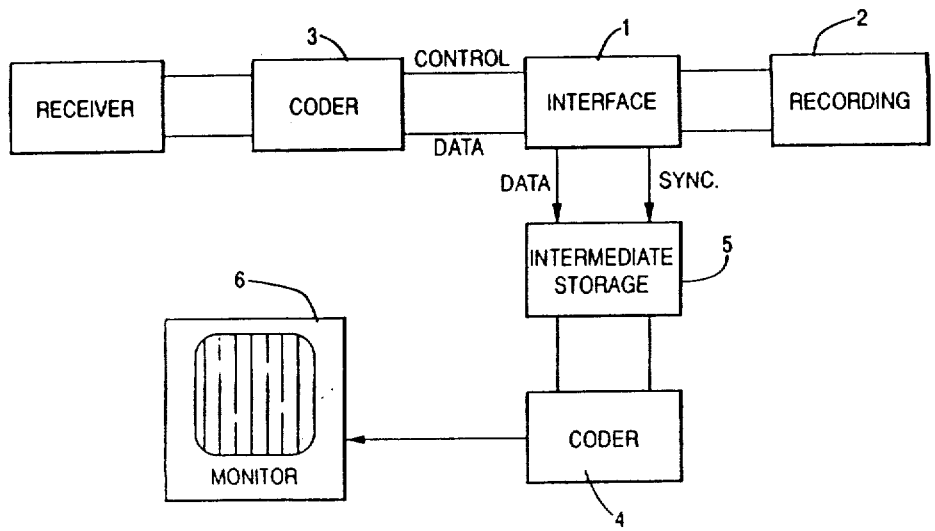

What is claimed is:

1. A method for immediate display of seismic traces on a data output device in which the time-dependent received signals received substantially simultaneously from a large number of seismic detectors are converted into a standard digital data transmission format for transmission to a recording apparatus, each detector comprising a single receiver or a group of receivers, the data transmission format having first signal portions corresponding to exponents of the signals and second signal portions corresponding to mantissas of the signals, the method comprising separating from the digital signal format signal portions corresponding to the exponent of the signal, temporarily storing the separated signal exponent portions, converting the temporarily stored signal portions into representational signal elements and displaying the signal elements from each detector along a time line, each of the signal elements being displayed as a generally straight line, with the elements representative of signals received from various detectors being arranged in side-by-side relationship and generally perpendicular to the time line.

2. A method according to claim 1 wherein the data output device is a cathode ray tube.

3. A method according to claim 2 wherein the data output device is a color cathode ray tube and the representational signal elements are capable of producing different colors on the cathode ray tube representative of different signal amplitudes.

4. A method according to claim 1 wherein the display is arranged to permit detection of defective seismic receiving means.

5. An apparatus for preparing signals received from a plurality of seismic receiving devices for substantially real-time display on a data output device in a system of the type including first coder means for receiving seismic signals from the plurality of seismic receiving devices and for converting said signals into a standard digital data transmission format for transmission to a recording unit, the data transmission format including a first signal portion corresponding to the exponent of a signal and a second signal portion corresponding to the mantissa of a signal, the apparatus comprising the combination of interface circuit means connected between said coder means and said recording means for uncoupling the first signal portion of each signal;

first intermediate memory means for temporarily storing said first signal portions;

second coder circuit means for converting each of said first signal portions into representational signal elements wherein predetermined value ranges of said first signal portions are represented by signal elements having distinctive characteristics; and means for displaying said representational signal elements on said data output device as straight traces arranged along a time axis with the traces resulting from the outputs of different seismic receivers being displayed simultaneously side-by-side substantially perpendicular to said time axis.

6. An apparatus according to claim 5 wherein said data output device is a color cathode ray tube and said representational elements are color pixels of a color monitor.

7. An apparatus according to claim 5 wherein the uncoupled signals also contain the sign of the different receiving signals.

8. An apparatus in accordance with claim 5 wherein the signals temporarily stored in the intermediate storage unit are sent directly into a video buffer of the cathode ray tube.

* * * * *

UNITED STATES PATENT AND TRADEMARK OFFICE
CERTIFICATE OF CORRECTION

PATENT NO. : 4,922,466

DATED : May 1, 1990

INVENTOR(S) : Burkhard Schmidt

It is certified that error appears in the above-identified patent and that said Letters Patent is hereby corrected as shown below:

The title page should be deleted to appear as per attached title page.

Signed and Sealed this

Ninth Day of April, 1991

*Attest:*

HARRY F. MANBECK, JR.

*Attesting Officer*  *Commissioner of Patents and Trademarks*

United States Patent [19]

Schmidt

[11] Patent Number: 4,922,466

[45] Date of Patent: May 1, 1990

[54] METHOD AND APPARATUS FOR PRESENTING SEISMIC TRACES

[75] Inventor: Burkhard Schmidt, Hanover, Fed. Rep. of Germany

[73] Assignee: Prakla-Seismos AG, Hanover, Fed. Rep. of Germany

[21] Appl. No.: 250,736

[22] Filed: Sep. 29, 1988

[30] Foreign Application Priority Data

Sep. 30, 1987 [DE] Fed. Rep. of Germany ....... 3733470

[51] Int. Cl.$^5$ .............................................. G01V 1/34
[52] U.S. Cl. ...................................... 367/68; 367/71; 367/74
[58] Field of Search ................... 367/63, 64, 68, 70, 367/71, 74, 13

[56] References Cited

U.S. PATENT DOCUMENTS

| 3,458,859 | 7/1969 | Godfrey et al. | 340/15.5 |
| 3,895,342 | 7/1975 | Mallett et al. | 367/63 |
| 3,961,306 | 6/1976 | Austey | 367/70 |
| 4,279,026 | 7/1981 | Lambright et al. | 367/70 |
| 4,323,990 | 4/1982 | Goode et al. | 367/74 |
| 4,397,007 | 8/1983 | Goode et al. | 367/68 |
| 4,574,358 | 3/1986 | Peterson et al. | 364/550 |

FOREIGN PATENT DOCUMENTS 2040296 of 0000 Fed. Rep. of Germany .
2644886C2 of 0000 Fed. Rep. of Germany .

OTHER PUBLICATIONS

Prakla-Seismos Information No. 10; Real Amplitude Processing; pp. 1-6; 1978.

Primary Examiner—Thomas H. Tarcza
Assistant Examiner—Ian J. Lobo
Attorney, Agent, or Firm—Walter C. Farley

[57] ABSTRACT

A method and apparatus for immediate, substantially real-time representation of the traces of seismic measurements in which the exponents and sign of the signal sample from the stream of data transmitted to a data recording unit (2) are uncoupled and are displayed as gradations of color on a monitor (6) of a personal computer. In this manner a quick overview of the measurement can be obtained, and the correctness of the installation and the operability of the receivers can be determined.

8 Claims 5 Drawing Sheets